United States Patent [19]

Price

[11] 4,454,693
[45] Jun. 19, 1984

[54] CONTINUOUS-UNLOADING SILO

[75] Inventor: Raymond R. Price, Rochester, Minn.

[73] Assignee: Rochester Silo, Inc., Rochester, Minn.

[21] Appl. No.: 354,139

[22] Filed: Mar. 5, 1982

[51] Int. Cl.³ .................................................. B65G 53/50
[52] U.S. Cl. ...................................... 52/248; 52/196
[58] Field of Search .............................. 52/192–197, 52/248, 245

[56] References Cited

U.S. PATENT DOCUMENTS

| 1,882,942 | 10/1932 | Ross | 52/248 X |
| 2,020,881 | 11/1935 | Ferris | 52/248 X |
| 2,074,592 | 3/1937 | Rowell | 52/248 X |
| 2,120,838 | 6/1938 | Lawrence | 52/248 X |
| 3,709,345 | 1/1973 | Price | 52/196 X |
| 4,015,384 | 4/1977 | Barry | 52/248 X |
| 4,057,295 | 11/1977 | Liet | 52/245 X |
| 4,118,909 | 10/1978 | Rutten et al. | 52/196 |
| 4,260,313 | 4/1981 | Van Dusen | 52/196 X |

Primary Examiner—J. Karl Bell
Attorney, Agent, or Firm—Williamson, Bains, Moore & Hansen

[57] ABSTRACT

A silo is provided with a thickened section along one portion of its circumference and located therein is a passage extending from top to bottom of the silo. This passage opens into the silo by means of an unobstructed opening which also runs from top to bottom of the silo. This opening may be covered by a series of doors which may be automatically opened and closed in conjunction with the silo unloading operation.

39 Claims, 17 Drawing Figures

CONTINUOUS-UNLOADING SILO

BACKGROUND OF THE INVENTION

In general, silos have been in use for many years. Typically, these silos have a series of vertically arrayed doors which open into the interior of the silo and discharge through an externally attached discharge chute. The farmer must serially open and close the doors and attach the silo unloader to each door frame in turn as the silo is emptied. This is time consuming, inefficient and requires a substantial amount of climbing, often at great heights in order to proceed with the unloading operation. None of the prior art silos disclose an integral discharge passage in the silo wall with a continuous vertical opening extending from top to bottom of the silo and which opening features no obstructions.

SUMMARY OF THE INVENTION

A silo is formed so that a portion of the circumference thereof has a thickened wall section which tapers gradually into a non-thickened portion. Located in this thickened portion is a continuous discharge passage which extends from the top of the silo to the bottom. A continuous discharge opening connects the discharge passage with the interior of the silo and this discharge opening is unobstructed by cross bars or other interfering devices when the door assemblies described hereinafter are opened. While reference is made herein to silos formed of blocks, it is understood that most of the features of the instant invention may be applied to other types of silos construction such as those which are poured in place. Also, as used herein, the term block should be understood to encompass any sort of modular building unit. Such alternative units could include bricks, metal modules or any other type of basic building unit.

A first plurality of blocks extends substantially around the silo and has a substantially uniform first thickness. Each of these blocks has a tongue member on one end and a groove member on the other end to join the blocks together. Reinforcing hooping is placed around the outside of the silo and the inside of the silo is plastered to present a smooth surface. This portion of the construction is conventional in nature and will not be elaborated on further. A second plurality of blocks tapers outwardly from the first thickness to a second thickness which is thick enough to allow the depth of the discharge passage in the wall desired. The blocks then taper downwardly back to the first thickness. This gradual tapering and modular construction allows the conventional hooping and construction technique to be utilized. Except for a double groove block and a double tongue block, the blocks that taper on one side of the discharge opening may be flipped over and used on the outer side to taper back to the first thickness thereby reducing the cost and number of separate block types which need to be cast. The blocks in the tapering section are also provided with a feature which allows a number of silo diameters to be constructed using one set of tapering blocks. Adjacent the outer surface of the tapering blocks, the conventional tongue and groove construction is used which allows the blocks to vary slightly in angle between adjacent blocks. Adjacent the inner surface of these blocks a substantial tab and slot is provided. This serves the purpose of allowing the variation in angle yet leaving a relatively small opening such that when the plastering operation is done, only a small gap need be filled regardless of the silo diameter. Without this tab and slot construction, large diameter silos would have a large angle between adjacent tapered blocks and would thus require substantial amount of plastering to fill the gap.

A door frame runs along each edge of the discharge opening. A series of doors are hingedly attached to the frame. The system is designed so that when the door is opened there is no obstruction whatsoever in the discharge opening thereby allowing the silo unloader to pass silage continuously through the discharge opening for unloading. In the preferred embodiment each door is mounted on parallel swing arms such that upon release of the latching mechanism, the door swing downwardly and back into the discharge passage adjacent the rear wall thereof. Alternatively, the door may be designed to move straight back into the same position. In the preferred embodiment, gravity assists in opening the doors so that once the latch is released, the door will basically open of its own accord. The bottom of each door overlaps the rear surface of the top of the door below it so as to prevent inadvertent release of the latch on the door below.

The latch is designed to be released by means of a carriage which travels vertically up and down the door frame. A pair of wheels mounted on the carriage press open the latch on each door as the carriage comes to that door. In general, the idea of this carriage which continuously opens the doors as it passes downwardly allows again the continuous operation referred to above and which is of vast improvement of the prior art. The door is shaped so as to present a generally continuing inner surface to the chamber such that the auger on the silo unloader may continue generally around the silo without interruption.

When it is desired to close the doors, the carriage is lifted (desirably along with silo unloader) and a hook on a spring loaded arm thereon engages a slot in each of the doors and pulls it upwardly and outwardly into position whereupon the latch operates to hold each individual door in place. When the carriage has been raised to the top of the silo and all of the doors closed, loading of the silo may then take place.

These and other objects and advantages of my invention will appear more fully from the following description made in conjunction with the accompanying drawings wherein like reference characters refer to the same or similar parts throughout the several views.

DESCRIPTION OF THE PREFERRED EMBODIMENT

Figures 1, 3:
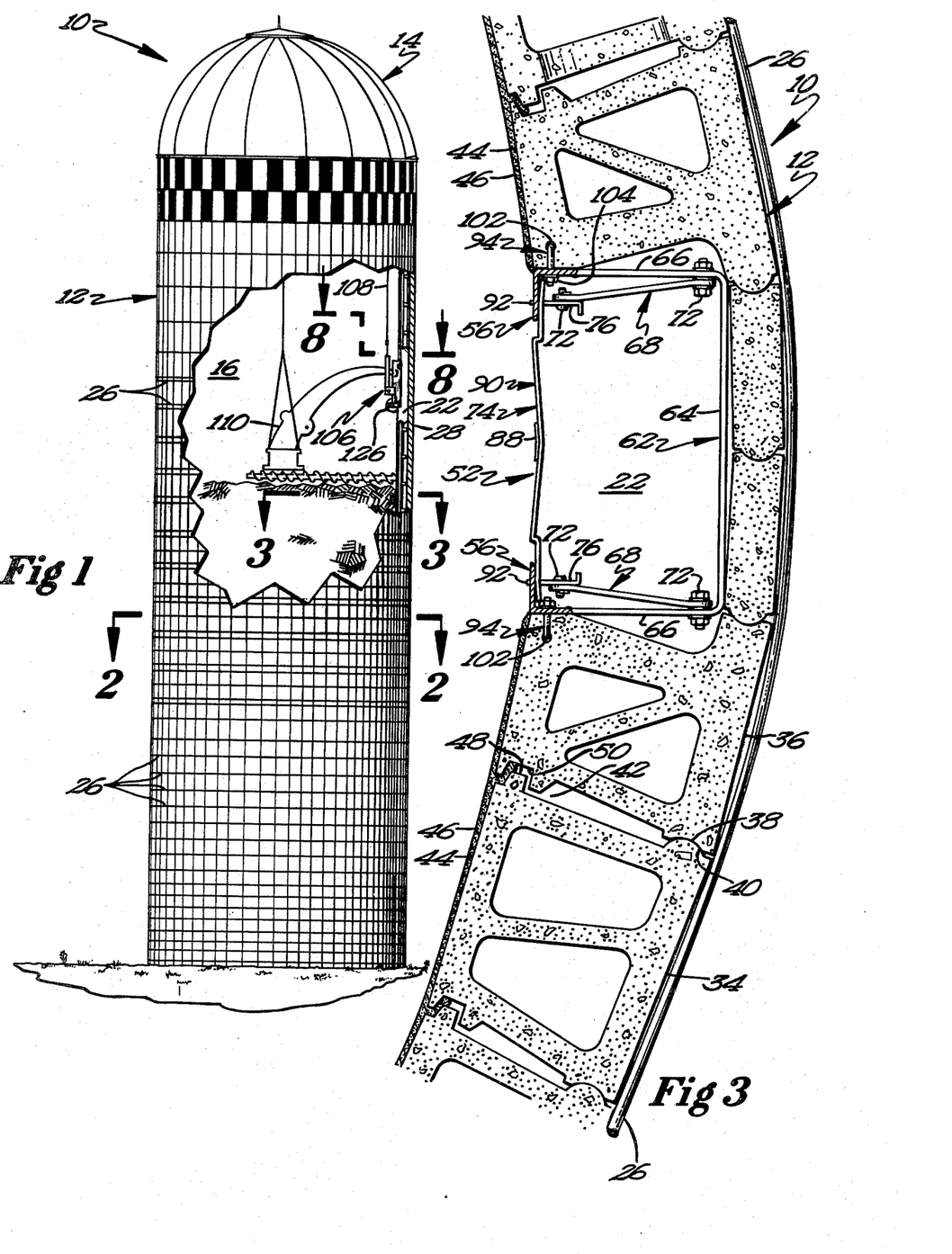
FIG. 1 is a plan front view of a silo partially cut away showing a portion of the instant invention.
FIG. 3 is a sectional view taken along line 3—3 of FIG. 1.
Figure 2:
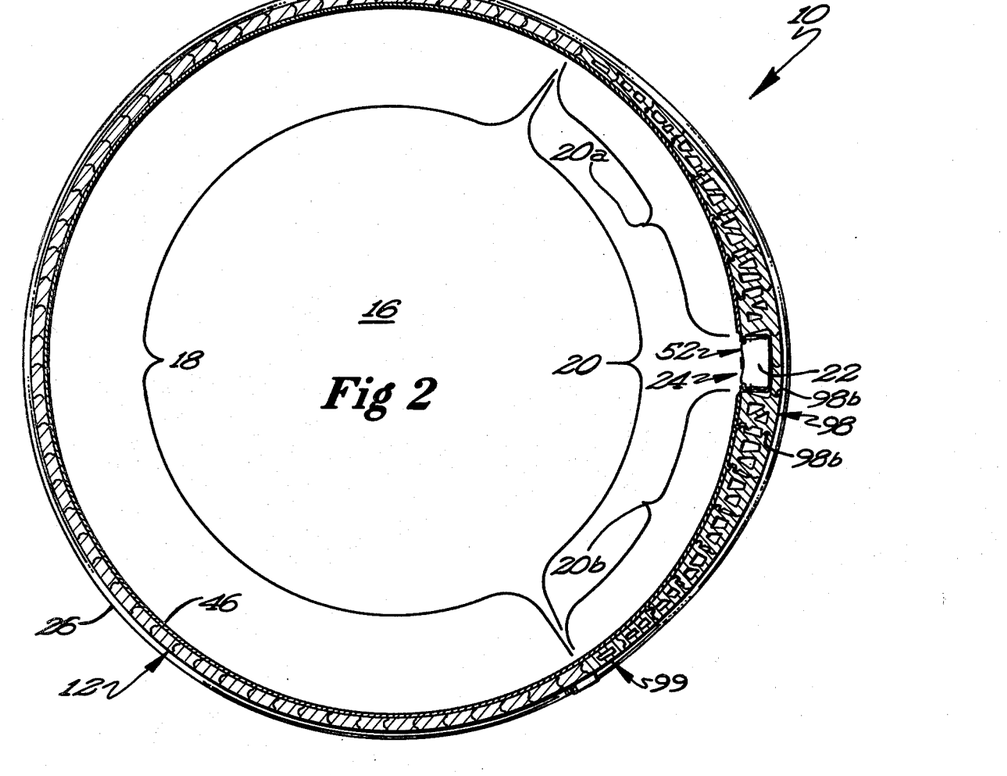
FIG. 2 is a sectional view taken along line 2—2 of FIG. 1.

The silo 10 of the instant invention is comprised generally of a cylindrical wall 12 topped by a hemispherical dome 14 as shown in FIG. 1. The cross section of cylindrical wall 12 is not circular but rather egg-shaped as shown best in FIG. 2. The wall 12 generally defines an interior chamber 16 for the storage of silage. Interior chamber 16 is generally circular in cross-section as shown in FIG. 2. A first plurality 18 of blocks extends perhaps a majority of the circumference of the silo which blocks are all of substantially a uniform first thickness. The blocks in first plurality 18 are generally conventional in nature, each having a tongue member on one end and a groove on the other. As is also conventional, this tongue and groove combination allows angular variation between adjacent blocks such that varying diameter silos may be built with the same block. A second plurality 20 of blocks tapers upwardly along the first segment 20a from the first thickness to a second thickness adjacent discharge passage 22. Discharge passage 22 is formed in a thickened section 24 of wall 12. Discharge passage 22 opens into interior chamber 16 through discharge opening 24 which is effectively a rectangular opening the width of which is shown in FIGS. 2, 3 and 7 and the height of which extends from the bottom to the top of the silo.

As can be seen in FIGS. 2 and 3, the blocks in first and second portion 20a and 20b taper outwardly to a second thickness adjacent discharge opening 22 and back to a first thickness in order to complete the wall 12. The blocks in second plurality 20 are hollow in nature and utilize a truss design to provide strength while at the same time minimizing the amount of material required. This hollow design also allows wiring for powering the unloading mechanism and for any other purposes to be run directly up through the blocks so that no external conduits or other such devices are required thereby protecting the wiring as well as presenting a more lightly appearance. As can be seen particularly in FIG. 2, the tapering blocks provide an outer surface of the silo which is egg-shaped and which presents a smoothly contoured surface such that conventional hooping 26 may be utilized in order to retain the blocks in their intended position and shape. As can be seen most easily in FIGS. 3 and 7, discharge passage 22 is defined by a rear wall 28 and first and second side walls 30 and 32 respectively. As can be seen most easily in FIG. 7, side walls 30 and 32 extend outwardly and away from each other so the width of discharge passage 22 adjacent rear wall 28 is wider than adjacent discharge opening 24. This allows discharge passage 22 to have more volume while at the same time minimizing the width of discharge opening 24.

As can best be seen in FIG. 3, adjacent blocks 34 and 36 are provided with a tongue 38 and groove 40 respectively or any other similar construction which permits the adjacent blocks to be mounted at varying angles to one another. This provision is generally known and permits the same blocks to be used in producing silos of varying diameter. Due to the thickness of the blocks adjacent discharge passage 22 however, where these blocks used to build a relatively large diameter silo, the gap 42 between adjacent blocks 34 and 36 would be quite substantial adjacent inner surface 44 of wall 12. This presents the problem such that when plaster 46 is applied to inner surface 44, gap 42 will require large amount of plaster 46 to fill. To solve this problem, a tab 48 and slot 50 are provided adjacent the inner surface 44 of wall 12. This allows the variations in angle between adjacent blocks 34 and 36 to take place as shown and yet leave a small gap which is easily filled with plaster 46 during the plastering operation.

Figure 7:
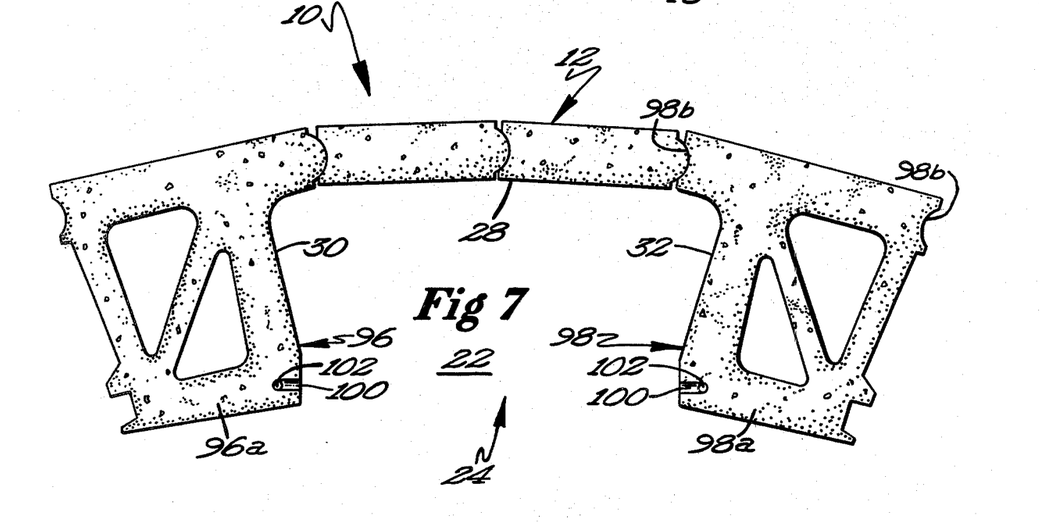
FIG. 7 is a detailed sectional view on the same section as FIG. 3 showing the discharge opening and passage.

As can be seen in FIGS. 2 and 7, block 98 has double grooves 98b. This allows the other tapered blocks to be used on both tapers (both sides of the discharge passage 22). A double tongued block 99 is then inserted elsewhere to complete the wall 12.

Figure 4:
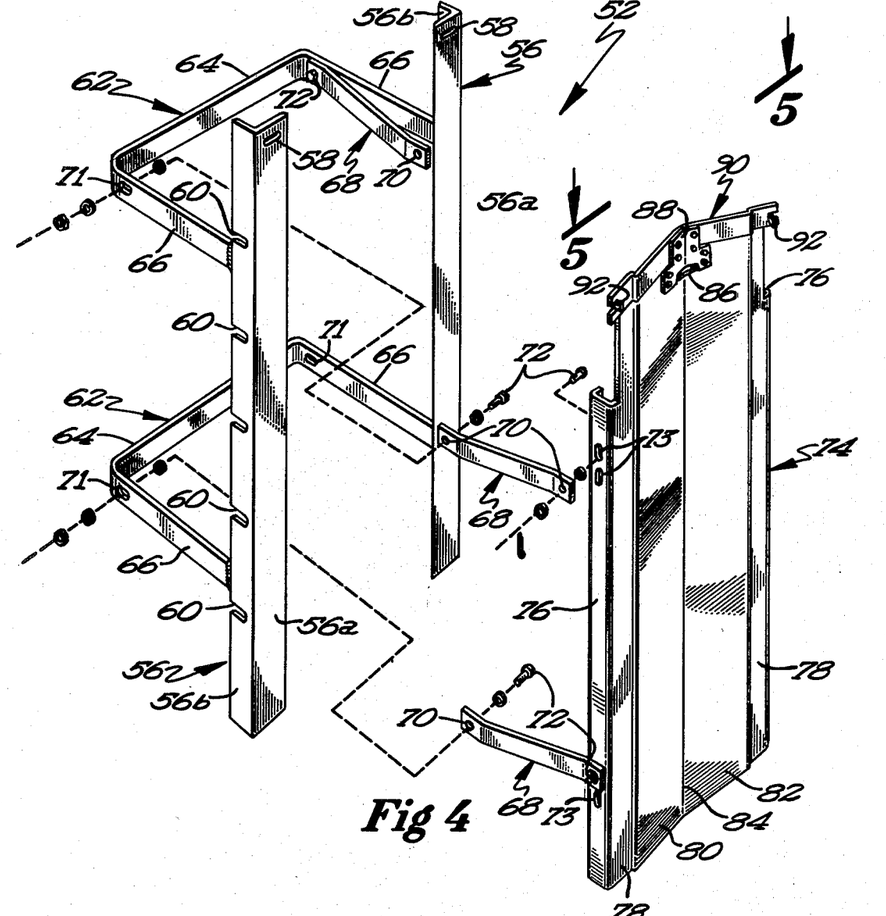
FIG. 4 is an exploded view showing the door and frame of assembly.
Figure 5:
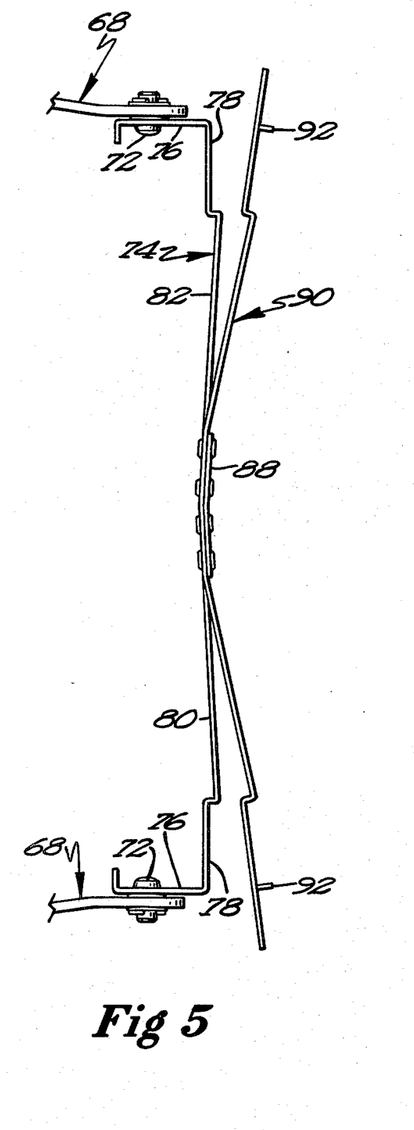
FIG. 5 is a sectional view taken aong line 5—5 of FIG. 4.
Figure 6:
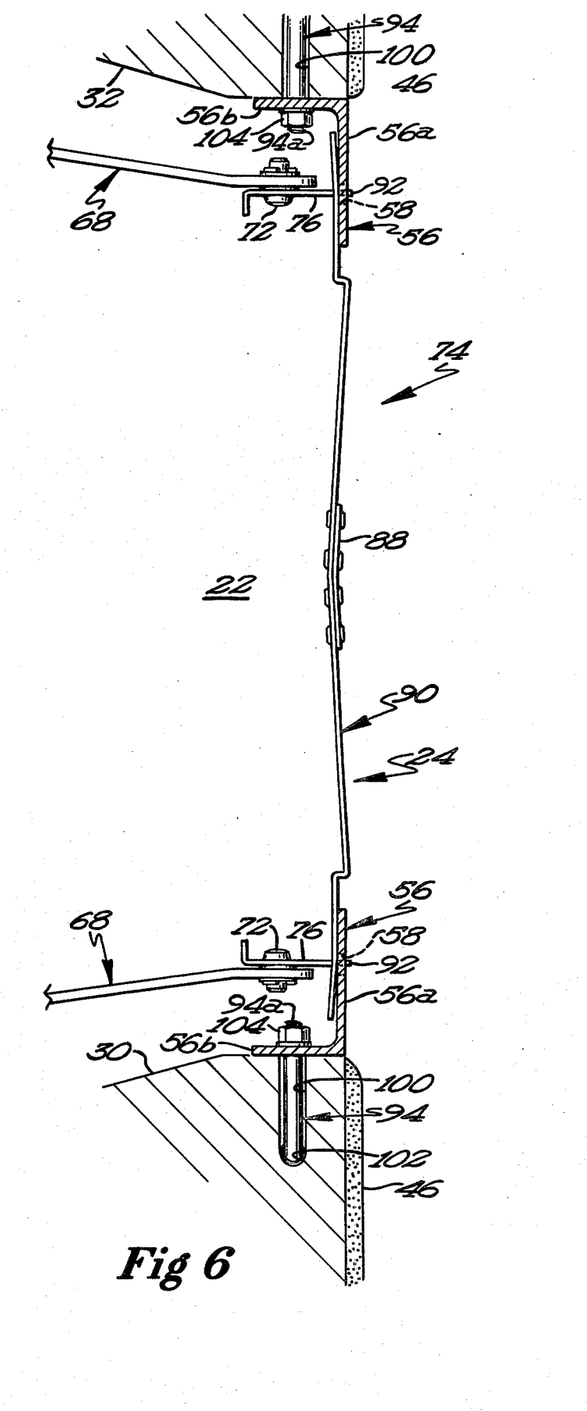
FIG. 6 is a detailed view of the door frame assembly on the same view shown in FIG. 3.

Turning now to the door assembly 52, that assembly is shown generally in FIGS. 3 and 4 with FIG. 4 showing the assembly exploded for better detail. In particular, door frame 54 is comprised of two angled members 56 which are fastened to passage sidewalls 30 and 32. Angle members 56 consist of a front flange 56a and a mounting flange 56b located at right angles thereto. Front flange 56a has a latch slot 58 at the top end thereof, the purpose of which will be explained hereinafter. Mounting flanges 56b have a plurality of mounting slots 60 therein for mounting frame 54 to wall 12. The details of this mounting will be explained more fully hereinafter. Hinge mounting members 62 are generally U-shaped and are comprised of a rear cross piece 65 and two side legs 66. Mounted to side legs 66 adjacent rear cross piece 64 are hinge members 68 which have mounting holes 70 at either end thereof. Hinge members 68 are mounted to side legs 66 by means of fasteners 72 which pass therethrough. Slotted holes 71 and 73 are provided in rame 54 and door 74 respectively to allow for a moderate amount of misalignment between door 74 and frame 54. This assures a smooth swinging action. The other end of hinge member 68 is mounted to side flange 76 of door 74. Door 74 is desirrable formed from a single sheet and generally rectangular in nature and has two shoulder panels 78 which rest against the back side of front flange 56a of angle member 56. Shoulders 78 are connected to main panels 80 and 82 which are connected to one another by crease 84 thereby forming a slight V-shape which can be seen in FIG. 3 and provides a general continuation of the circular inner surface of the silo. This allows an unloader or other such device to sweep entirely about the circumference of interior chamber 16 without hanging up on a protruding door.

Located at the top of door 74 is closing slot 86, the function of which will be more fully explained hereinafter. A latch mounting plate 88 is mounted just above closing slot 86 and attached thereto is a latch member 90 which is desirably formed of spring steel which is resilient and the actual function of which will be more fully described hereinafter. Located at the outer end of latch member 90 are projection latch tabs 92 which are designed for engagement in latch holes 58 of angle members 56. Latch mounting plate 88 also serves to reinforce the closing hole 86.

Figures 13, 17:
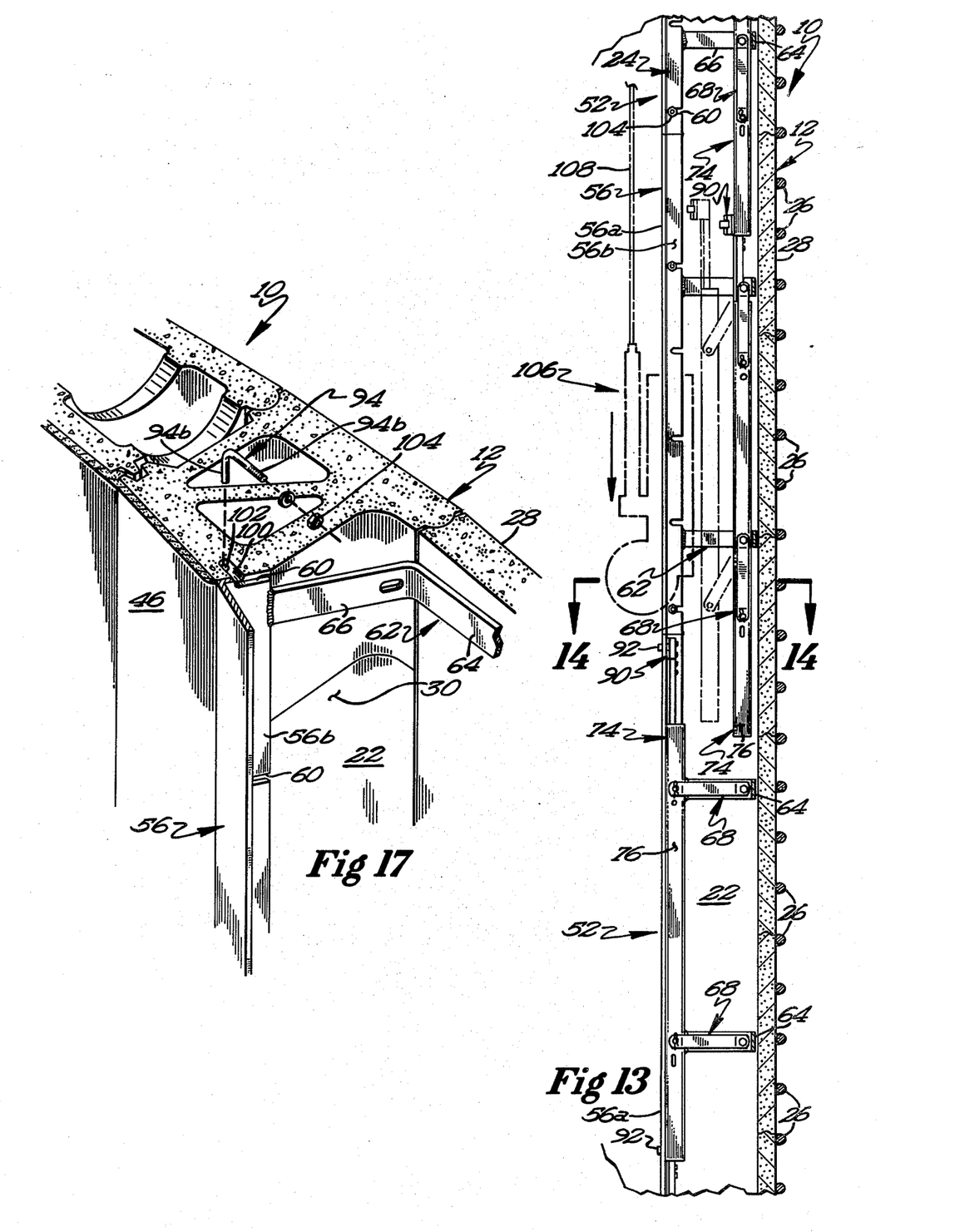
FIG. 13 is an assembly drawing showing the doors swinging between the open and closed portion.
FIG. 17 shows the detail of the mounting of the frame to the adjacent block module.
Figures 15, 16:
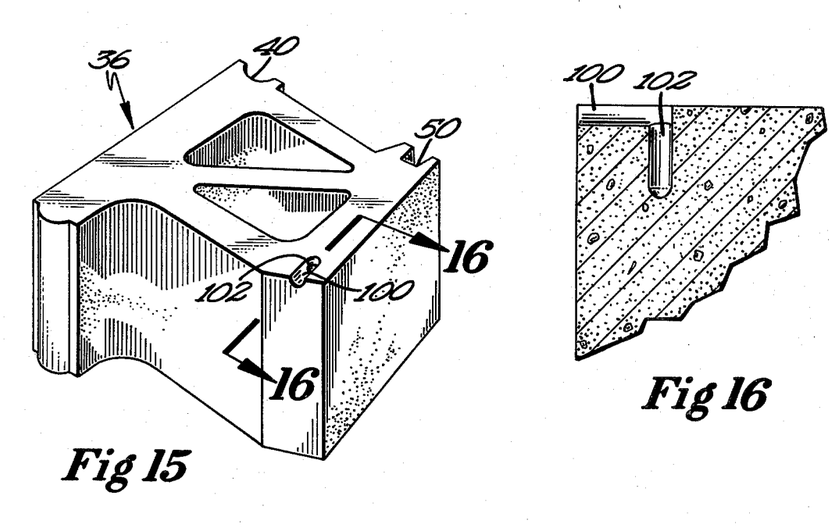
FIG. 15 is a perspective view of the block module adjacent the discharge passage.
FIG. 16 is a sectional view taken along line 16—16 of FIG. 15 showing the detail of the frame mounting holes.

As can be seen most clearly in FIGS. 15 and 17, angle members 56 of frame 54 are mounted to passage sidewalls 30 and 32 by means of L-bolts 94 which have a threaded first leg 94a and a second leg 94b. Blocks 96 and 98 which form passage sidewalls 30 and 32 respectively are provided on their upper surfaces 96a and 98a respectively with a groove 100 which extends inwardly and terminates in a downward bore 102. L-bolt first leg 94a rests in groove 100 while second leg 94b is inserted into bore 102. Threaded portion 94a extends through frame slot 60 and is held in place by nut 104. L-bolt 94 is held in place in groove 100 and bore 102 by the means of the next layer of blocks which are placed on top of those shown. As can be seen the slots 60 allow the entire silo wall to be erected with L-bolts 94 in place and the frame merely slid inwardly into passage 22 and nuts 104 tighten to fasten frame assembly 52 securely in position.

Figures 8, 10:
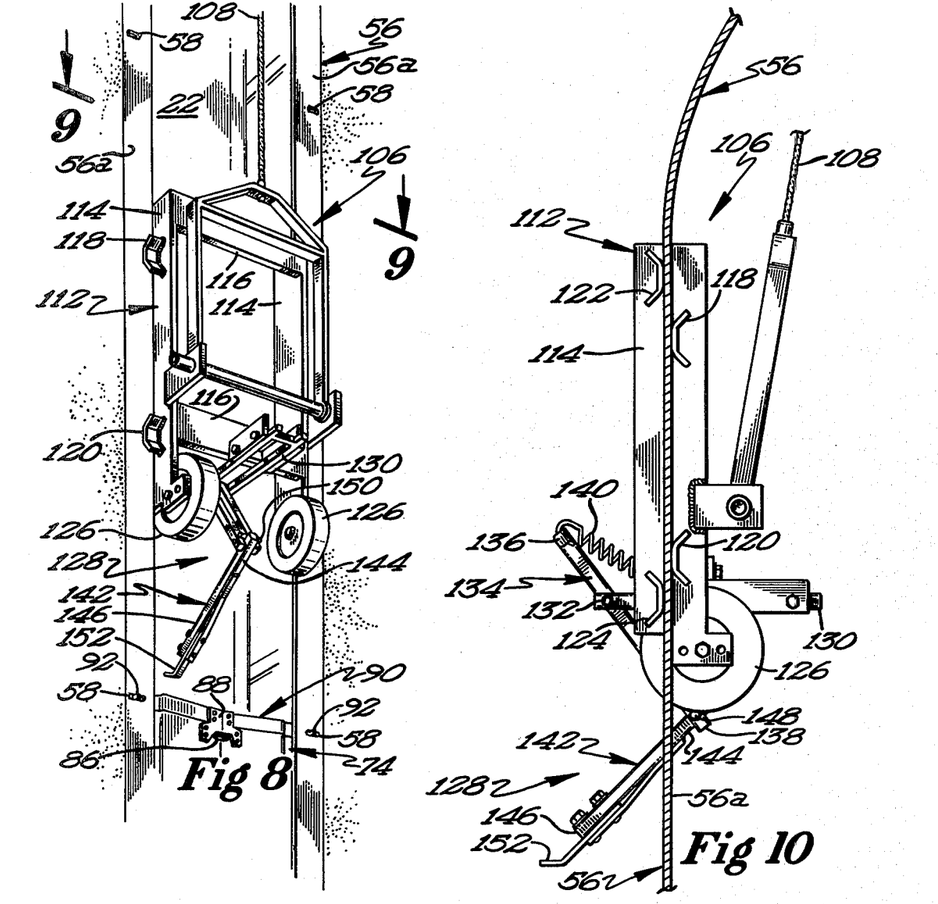
FIG. 8 is a perspective view showing the carriage mounted on the door and frame assembly.
FIG. 10 is a sectional view taken along line 10—10 of FIG. 9.
Figure 9:
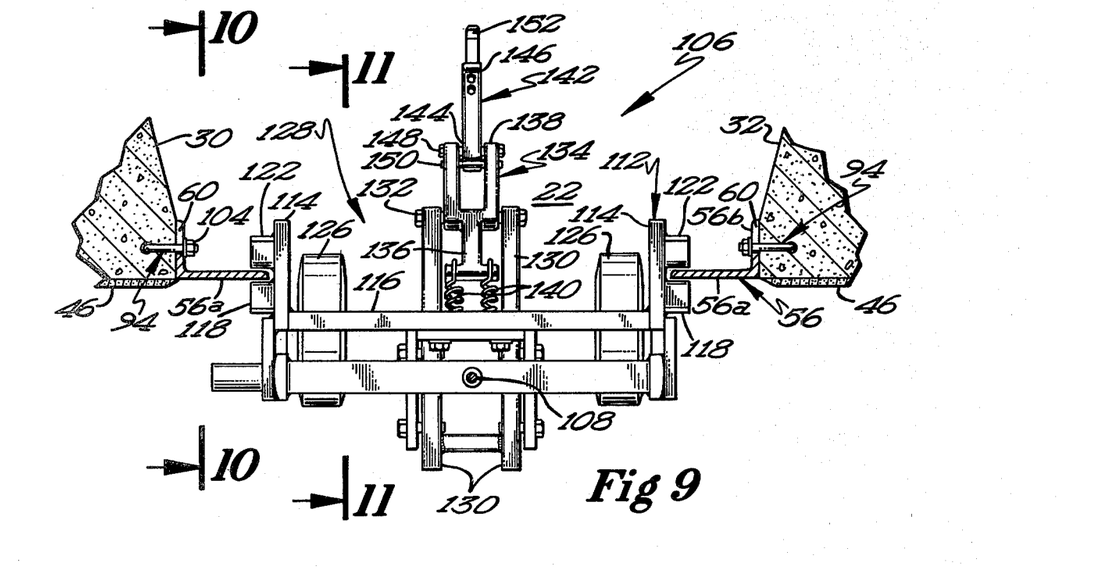
FIG. 9 is a sectional view taken along line 9—9 of FIG. 8.

The carriage 106 of the instant invention is shown in FIGS. 8 through 12. As shown in the drawings herein, carriage 106 is raised and lowered by means of cable 108. Cable 108 may be designed to move in conjunction with a silo unloader 110 (shown generally in FIG. 1) or it may be raised and lowered independently of unloader 110. It is also first seen that carriage 106 may be self propelled and hence no cable would be required. In any case, carriage 106 is comprised of a carriage frame 112 which is in turn comprised generally of side members 114 and cross members 116. As shown in FIGS. 9 and 10, carriage 106 is designed to ride on front flange 56a of door frame 56. Particularly, chamber side upper and lower guides 118 and 120 are located to ride on the chamber surface of front flange 56a while passage side upper and lower guides 122 and 124 respectively ride on the rear side of flange 56a. Guides 118 through 124 are generally U-shaped and are designed to allow carriage 126 to be raised into dome 14 when silo 10 is full. Toward this end, chamber side guides 118 and 120 are located closer to one another and between passage guide 122 and 124. This arrangement can be seen most clearly in FIG. 10 and allows carriage 106 to follow a curved path.

Figure 14:
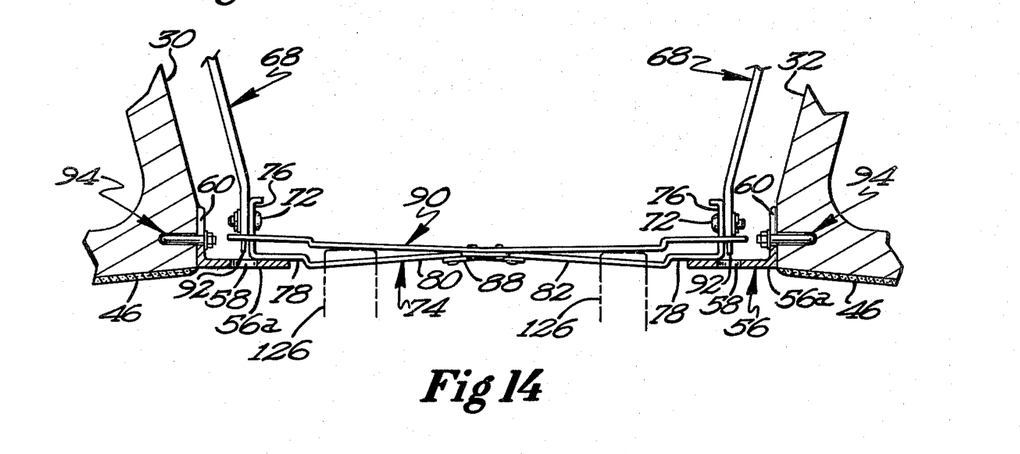
FIG. 14 is a sectional view taken along line 14—14 of FIG. 13.

Unlatching wheels 126 are rotatably mounted at the lower end of carriage side rails 114. As can be seen in FIG. 14, wheels 126 are designed to engage latch spring 90 as will be more fully described hereinafter. These wheels are utilized to open the doors 74 when it is desired to unload the silo.

Figures 11, 12:
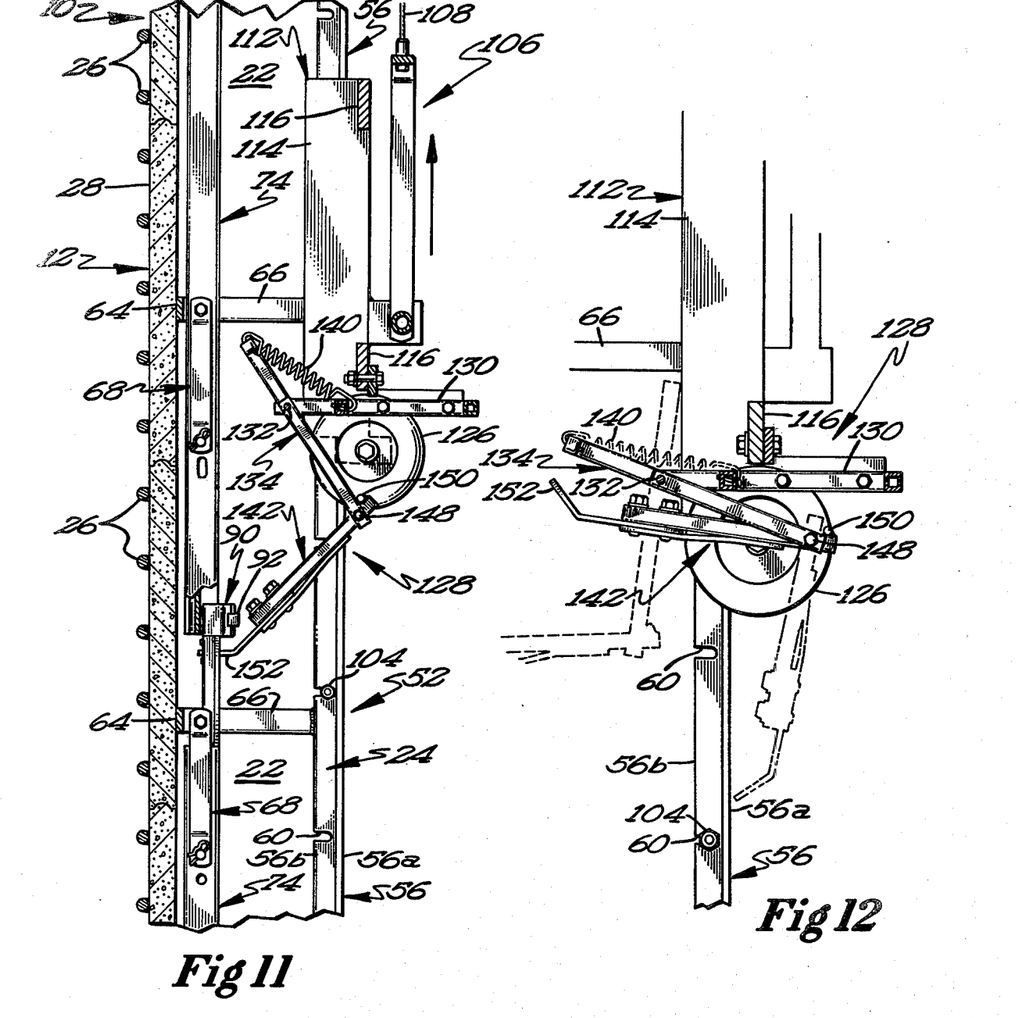
FIG. 11 is a sectional view taken along line 11—11 of FIG. 9.
FIG. 12 is a detailed view from the same point of view as FIG. 11 showing the carriage while opening doors.

Closing assembly 128 has a closing mounting bar 130 attached to the bottom cross member 116 of carriage 106. Hingedly attached at pivot point 132 is first closing arm 134 having a first end 136 and a second end 138 between which lies pivot point 132. A spring 140 helps urge first closing arm 134 in a clock-wise direction and is mounted between first end 136 and mounting member 130. Attached to first closing arm 134 adjacent second end 138 is second closing arm 142 which has first and second ends 144 and 146 respectively. Second closing arm 142 pivots to first closing arm 134 at pivot 148. A stop member 150 is located on second closing arm 142 so as to limit the movement in a counter-clockwise direction of second closing arm 142 relative to first closing arm 134 to that position shown in FIG. 11. Otherwise, second closing arm 142 may move in a clockwise direction to that position shown in solid in FIG. 12. Mounted at the second end 146 of second closing arm 142 is an engaging means in the form of a closing hook 152 which is preferably formed of spring steel of the like and which has a dog-legged shape such as shown in FIG. 11. Hook 152 is designed for engagement in closing slot 86, the functioning of which will be more fully described hereinafter.

OPERATION OF THE INVENTION

For purposes of this discussion, assume that the silo is initially full. In that case, the unloader 110 which is attached to carriage 106 will be located in the dome 14 of silo 10. Thence, unloader 110 is activated and lowered whereupon the silage is blown to the top of discharge passage 22. As carriage 106 comes to the first door 74, the wheels 126 on carriage 106 engage the top edge of latch spring 90 and press it outwardly into passage 22 as shown in FIG. 14. This has the effect of disengaging latch tabs 92 from latch holes 58. At that point, the weight of door 74 causes the door 74 to swing downwardly in the direction of passage rear wall 28 as shown in FIG. 13 thereby providing an unobstructed opening 24 into discharge passage 22. As carriage 106 travels downwardly wheels 126 contact latch springs 90 on other doors 74 thereby consecutively releasing each door. As can be seen in FIGS. 11 and 13, the bottom of any given door lies behind, that is, on the passage side of the spring 90 of the door below it. This has the effect of preventing the silage from inadvertently unlatching a door until desired.

During the downward travel of carriage 106 the door opening process, the closing assembly 128 assumed the position shown in solid in FIG. 12, that is second closing arm 142 is folded up against first closing arm 134.

To reverse the operation, the carriage 106 is essentially located at the bottom of the silo to start. Second closing arm 142 swings downwardly to the position shown in FIG. 11 and as carriage 106 is drawn upwardly, spring 140 urges closing arms 134 and 142 toward the open doors such that hook 152 is engaged in closing slot 86. As carriage 106 continues upwardly, each door 74 is lifted toward the closed position such as shown in FIG. 8 and at the point in which latch tabs 92 engage latch slots 58, the door 74 will have reached its upward most limit of travel and due to the spring nature of hook 152, that hook will release. At that point, carriage 106 continues upwardly until hook 152 engages the next door 74 and repeats the process. Note that spring 140 keeps hook 152 engaged with the front surface of each door 74. As shown in FIG. 1, silo unloader 110 is arranged so as to discharge into the rectangle frame by carriage frame 112. It is appreciated, however, that unloader may be located so as to discharge into any portion of discharge passage 22 which is accessable through discharge opening 24 through an open door or doors.

It should be apparent that the instant invention can operate in other ways. For instance, the doors could be opened and closed in unison by means of a cable arrangement or the like. Also any number of other door arrangements may be utilized with the continuous opening silo.

While the preferred embodiments of the present invention have been described, it should be understood that various changes, adaptions and modifications may be made therein without departing from the spirit of the invention and the scope of the appended claims.

What is claimed is:

1. A silo, said silo comprising:
    an interior chamber, said chamber comprising a chamber wall having an inner surface;
    a continuous discharge passage extending substantially the height of said chamber and being located in said wall; and
    a discharge opening connecting said passage and said chamber, said opening extending continuously through said inner surface for substantially the height of said chamber, said opening being unobstructed.

2. A silo comprised of a plurality of blocks, each said block comprising:
    an outer surface, said outer surface having first and second ends;
    mating means adjacent said outer surface ends for locating adjacent blocks, said mating means comprising angle variation means for allowing variation in the angle of one block relative to another;
    an inner surface, said inner surface having first and second ends;
    tongue means adjacent said inner surface first end; and
    groove means adjacent said inner surface second end so as to allow substantial variations in angle while leaving a minimal gap in said inner surface to be filled during plastering.

3. A silo, said silo comprising:
    an interior chamber, said chamber comprising a chamber wall, said wall comprising;
    a first plurality of blocks of a first thickness and extending a portion of the circumferences of said silo; and
    a second plurality of blocks extending the remainder of said circumference said second plurality tapering from said first thickness to a second thickness and back to said first thickness, said second thickness being greater than said first thickness.

4. The silo of cliam 3 wherein at least some blocks of said second plurality are hollow allowing wiring to pass therethrough.

5. The silo of claim 3 wherein at least some blocks in said second plurality have a graduated thickness.

6. The silo of claim 3 said second plurality comprising:
    a first block type having a first mating part at both ends thereof; and
    a second block type having a first mating part at one end and a second mating part at the other end thereof thereby allowing the same blocks to be used on both tapers.

7. A silo, said silo comprising:
    an interior chamber, said chamber comprising and surrounded by a chamber wall;
    a discharge passage extending substantially the height of said chamber; and
    a discharge opening connecting said discharge passage and said chamber, said opening extending continuously through said wall for substantially the height of said chamber, said opening being unobstructed.

8. The silo of claim 7 wherein said discharge opening and passage are located in a thickened section of said chamber wall.

9. The silo of claim 8 wherein the exterior of said chamber wall is continuously curved.

10. The silo of claim 9 wherein said chamber is substantially round in cross-section.

11. The silo of claim 10 wherein said chamber wall is comprised of a plurality of blocks.

12. The silo of claim 11 wherein said blocks are held in place at least partially by hoops running around the exterior of said silo.

13. The silo of claim 11, each said block comprising:
    mating means for locating adjacent blocks, said mating means allowing a variation in the angle of one block relative to another;
    an inner surface having first and second ends;
    tongue means adjacent said first end; and
    groove means adjacent said second end thereby allowing the construction of varying diameter silos with a minimum of plastering.

14. The silo of claim 7 further comprising a door assembly, said door assembly comprising;
    a frame mounted in said discharge opening; and
    a plurality of doors hingedly attached to said frame.

15. The silo of claim 14 wherein said chamber wall is comprised of a plurality of blocks, said frame being fastened in said opening by at least one L-bolt, each said L-bolt having first and second legs, said first leg being located between at least two vertically adjacent said blocks and said second leg being attached to said frame.

16. The silo of claim 14, said opening comprising first and second sides, said frame having first and second sides adjacent said opening first and second sides respectively, said latch means being located on said frame first and second sides.

17. The silo of claim 14, said frame extending above said passage.

18. The silo of claim 14 wherein said door assembly further comprises means for latching said doors in a fixed position relative to said frame.

19. The silo of claim 18 further comprising a carriage assembly, said carriage assembly comprising:
    a carriage base;
    means for raising and lowering said carriage base in said chamber;
    means for positioning said carriage base relative to said frame; and
    means for operating said latch means.

20. The silo of claim 19 further comprising means for closing said doors.

21. The silo of claim 14 wherein each said door is movable between an open position allowing communication between said chamber and said passage, and a closed position preventing communication between said chamber and said passage.

22. The silo of claim 21 wherein said latch means latch said doors in said closed position.

23. The silo of claim 22 wherein a portion of said frame extends into said passage, said door assembly further comprising hinge members having first and second ends, each said hinge member first end being rotatably attached to said frame portion and each said hinge member second end being rotatably attached to one of said doors.

24. The silo of claim 23 wherein said door when in said open position is below said closed position so that upon release of said latch means, said door swings downwardly from said closed position to said open position.

25. The silo of claim 24 wherein each said door has an inner surface facing into said chamber, each said latch means being substantially contiguous with said door inner surface.

26. The silo of claim 25 wherein said latch means is releasable by means of outward pressure thereon from inside said chamber.

27. The silo of claim 24 wherein said hinge members are horizontal when said door is in said closed position.

28. The silo of claim 23 wherein said rotatable attachements comprise means for allowing translational movement between hinge members, said frame portions, and said doors.

29. The silo of claim 28 wherein said means for allowing translational movement comprises slotted holes.

30. The silo of claim 14, each said door presenting a uniform interior surface in continuation with said chamber wall.

31. The silo of claim 14 wherein said doors are located one above another, each said door overlapping said inner surface of the door above.

32. The silo of claim 31 wherein each said door comprises receiving means and said closing means comprising engaging means for cooperating with said receiving means.

33. The silo of claim 7 further comprising a mechanism mounted to vertically transverse said chamber wall from top to bottom adjacent said opening.

34. The silo of claim 33 further comprising;
a frame in said opening; and
a plurality of doors mounted to said frame.

35. The silo of claim 34 said mechanism comprising means for cleaning said frame and said doors.

36. The silo of claim 34 said mechanism comprising means for opening said doors.

37. The silo of claim 34 said mechanism comprising means for closing said doors.

38. The silo of claim 33 said mechanism further comprising means for directing discharged material into said passage.

39. The silo of claim 38 further comprising a silo unloader, said mechanism and said directing means being attached to and moving vertically with said unloader.

* * * * *